(12) United States Patent
Mitani

(10) Patent No.: US 10,126,520 B2
(45) Date of Patent: Nov. 13, 2018

(54) ROTATION REGULATING DEVICE AND LENS BARREL

(71) Applicant: Konica Minolta, Inc., Tokyo (JP)

(72) Inventor: Yoshifumi Mitani, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 87 days.

(21) Appl. No.: 14/973,161

(22) Filed: Dec. 17, 2015

(65) Prior Publication Data

US 2016/0178038 A1 Jun. 23, 2016

(30) Foreign Application Priority Data

Dec. 17, 2014 (JP) ................................. 2014-255120

(51) Int. Cl.
| | |
|---|---|
| G02B 7/00 | (2006.01) |
| G02B 7/02 | (2006.01) |
| G02B 27/64 | (2006.01) |
| G03B 5/00 | (2006.01) |
| G02B 7/10 | (2006.01) |

(52) U.S. Cl.
CPC ............ *G02B 7/026* (2013.01); *G02B 7/004* (2013.01); *G02B 27/646* (2013.01); *G03B 5/00* (2013.01); *G02B 7/102* (2013.01); *G03B 2205/0015* (2013.01); *G03B 2205/0053* (2013.01)

(58) Field of Classification Search
CPC ........ G02B 7/026; G02B 27/646; G02B 7/04; G02B 13/001; G02B 26/00; G02B 7/023; G02B 7/08; G02B 7/09; G02B 7/102; G03B 5/00; G03B 2205/0015; G03B 2205/0053

USPC ........................................................ 359/814
See application file for complete search history.

(56) References Cited

U.S. PATENT DOCUMENTS

| | | | | |
|---|---|---|---|---|
| 7,773,321 | B2* | 8/2010 | Matsui ................. | H04N 5/2253 359/696 |
| 2004/0042089 | A1* | 3/2004 | Nomura .................. | G02B 7/08 359/819 |
| 2005/0111113 | A1* | 5/2005 | Shirie ...................... | G02B 7/08 359/701 |
| 2010/0157071 | A1* | 6/2010 | Lee .......................... | G03B 5/00 348/208.2 |
| 2011/0107758 | A1* | 5/2011 | Kotanagi ................ | F03G 7/065 60/528 |
| 2012/0154912 | A1* | 6/2012 | Shihoh ................... | G02B 27/64 359/554 |

FOREIGN PATENT DOCUMENTS

JP 2010-049153 A 3/2010

* cited by examiner

*Primary Examiner* — Ricky Mack
*Assistant Examiner* — Daniele Manikeu
(74) *Attorney, Agent, or Firm* — Osha Liang LLP

(57) ABSTRACT

A rotation regulating device and a lens barrel includes a rotating ring, a holder that rotatably holds the rotating ring, a rotation regulator that regulates the rotation of the rotating ring by contacting and stopping the rotating ring, and a receiver that receives a part of the rotation regulator. The rotation regulator is held on the holder and formed of an elastic body. The holder includes a holding shaft that holds the rotation regulator and a rotation stopper that stops the rotation regulator to prevent the rotation regulator from rotating about the holding shaft.

3 Claims, 4 Drawing Sheets

ROTATION REGULATING DEVICE AND LENS BARREL

TECHNICAL FIELD

One or more embodiments of the present invention relate to a rotation regulating device for regulating the rotation of a rotating ring by contacting and stopping the rotating ring and a lens barrel using the same.

BACKGROUND ART

A rotation regulating device for regulating the rotation of a rotating ring by contacting and stopping the rotating ring is disclosed, for example, in Japanese Unexamined Patent Publication No. 2010-49153 (literature 1). The rotation regulating device disclosed in this literature 1 is used in a lens barrel and includes a rotating ring, a holder rotatably holding the rotating ring and a rotation regulator held on the holder and formed of an elastic body for regulating the rotation of the rotating ring by contacting and stopping the rotating ring. The rotation regulator is held on two shafts formed at a distance from each other on the holder. The rotating ring is contacted and stopped by one circumferential end surface of the rotation regulator in rotating the rotating ring toward one side and the rotating ring is contacted and stopped by the other circumferential end surface of the rotation regulator in rotating the rotating ring toward the other side, whereby the rotation of the rotating ring is regulated.

However, since the rotation regulator is held on the two shafts formed at a distance from each other in the circumferential direction of the rotating ring in the literature 1, the rotation regulator is easily displaced from a set position relative to the rotating ring due to the position of each of the two shafts and dimensional manufacturing errors such as an interval between the two shafts and it is difficult to arrange the rotation regulator at the set position relative to the rotating ring.

Since the rotation regulator is held on the two shafts formed at a distance from each other in the circumferential direction of the rotating ring, a length (width) of the rotation regulator in the circumferential direction is long. As a result, the dimensional accuracy of the rotation regulator formed of the elastic device is reduced. In addition, an arrangement space for the rotation regulator becomes larger and an arrangement space for another member becomes narrower.

SUMMARY

One or more embodiments of the present invention provide a rotation regulating device and a lens barrel capable of easily arranging a rotation regulator at a set position relative to a rotating ring, suppressing a reduction in the dimensional accuracy of the rotation regulator formed of an elastic body and making an arrangement space for the rotation regulator smaller.

A rotation regulating device and a lens barrel according to one or more embodiments of the present invention include a rotating ring, a holder that rotatably holds the rotating ring, a rotation regulator that regulates a rotation of the rotating ring by contacting and stopping the rotating ring, and a receiver that receives a part of the rotation regulator. The rotation regulator is held on the holder and is formed of an elastic body. The holder includes a holding shaft that holds the rotation regulator and a rotation stopper that stops the rotation regulator to prevent the rotation regulator from rotating about the holding shaft. Thus, in the rotation regulating device and the lens barrel according to one or more embodiments of the present invention, the rotation regulator can be easily arranged at a set position relative to the rotating ring, a reduction in the dimensional accuracy of the rotation regulator formed of the elastic body can be suppressed and an arrangement space for the rotation regulator can be made smaller.

One or more embodiments of the present invention will become more apparent upon reading the following detailed description along with the accompanying drawings.

DESCRIPTION OF EMBODIMENTS

Hereinafter, embodiments of the present invention are described based on the drawings. Note that parts denoted by the same reference signs in the respective drawings are the same parts and the description thereof is omitted as appropriate. In this specification, parts are denoted by reference signs without suffixes when being collectively called while being denoted by reference signs with suffixes when being individually denoted.

Figure 1:
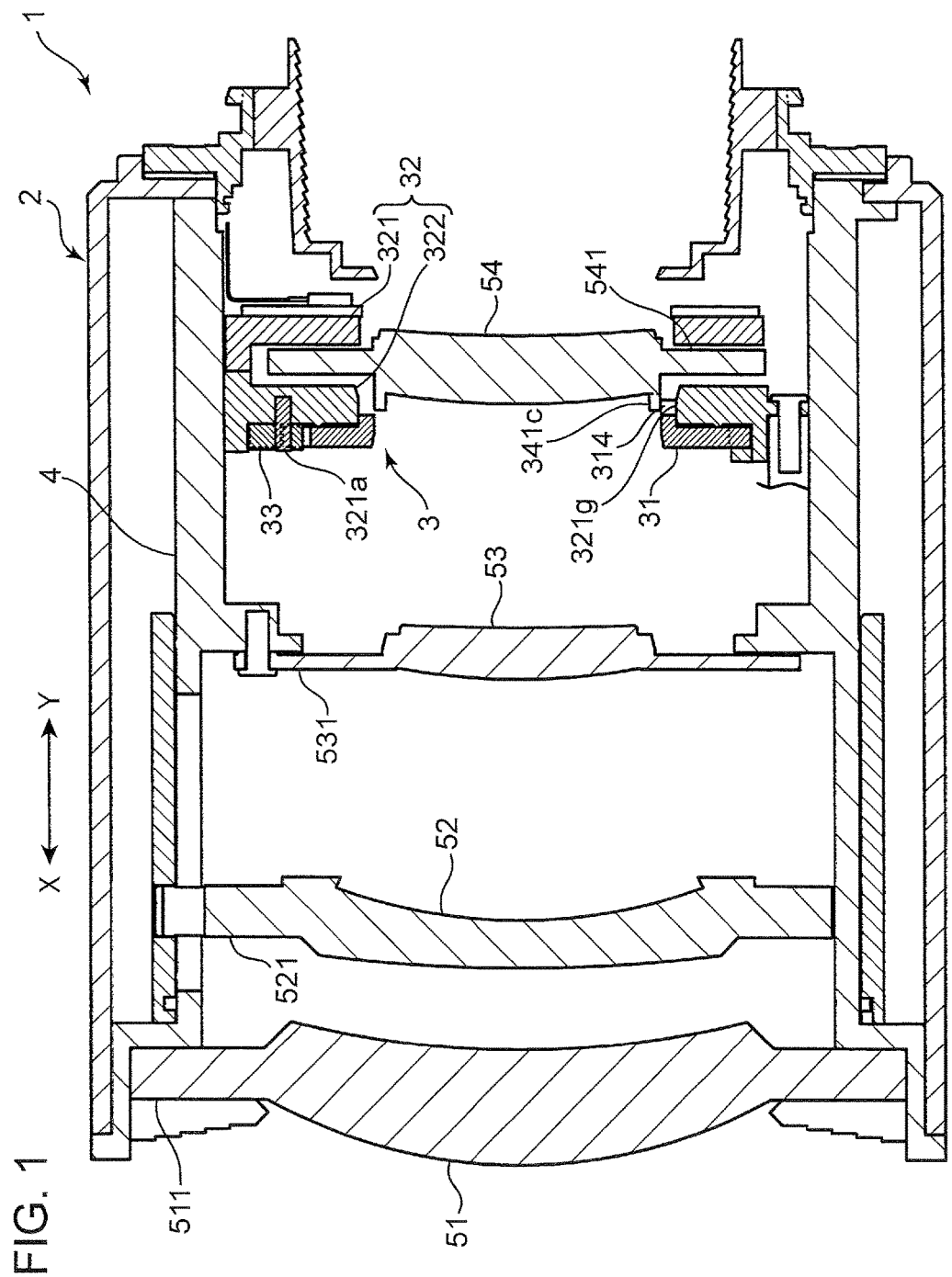
FIG. 1 is a sectional view of a lens barrel including a rotation regulating device according to one or more embodiments of the present invention.
Figure 2:
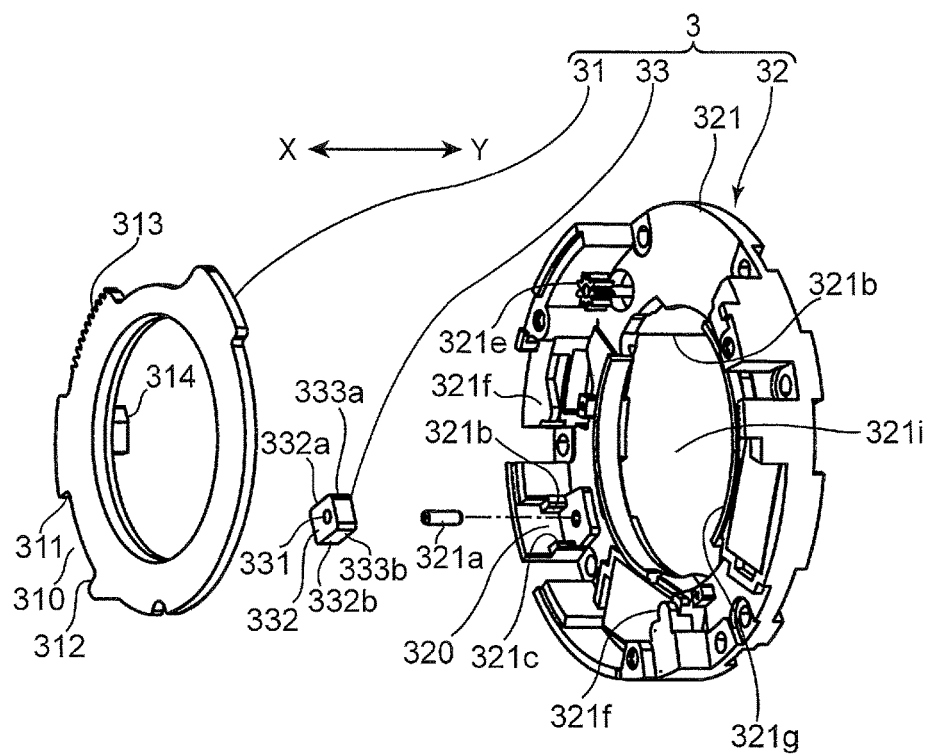
FIG. 2 is an exploded perspective view of a part of the rotation regulating device shown in FIG. 1.
Figure 3:
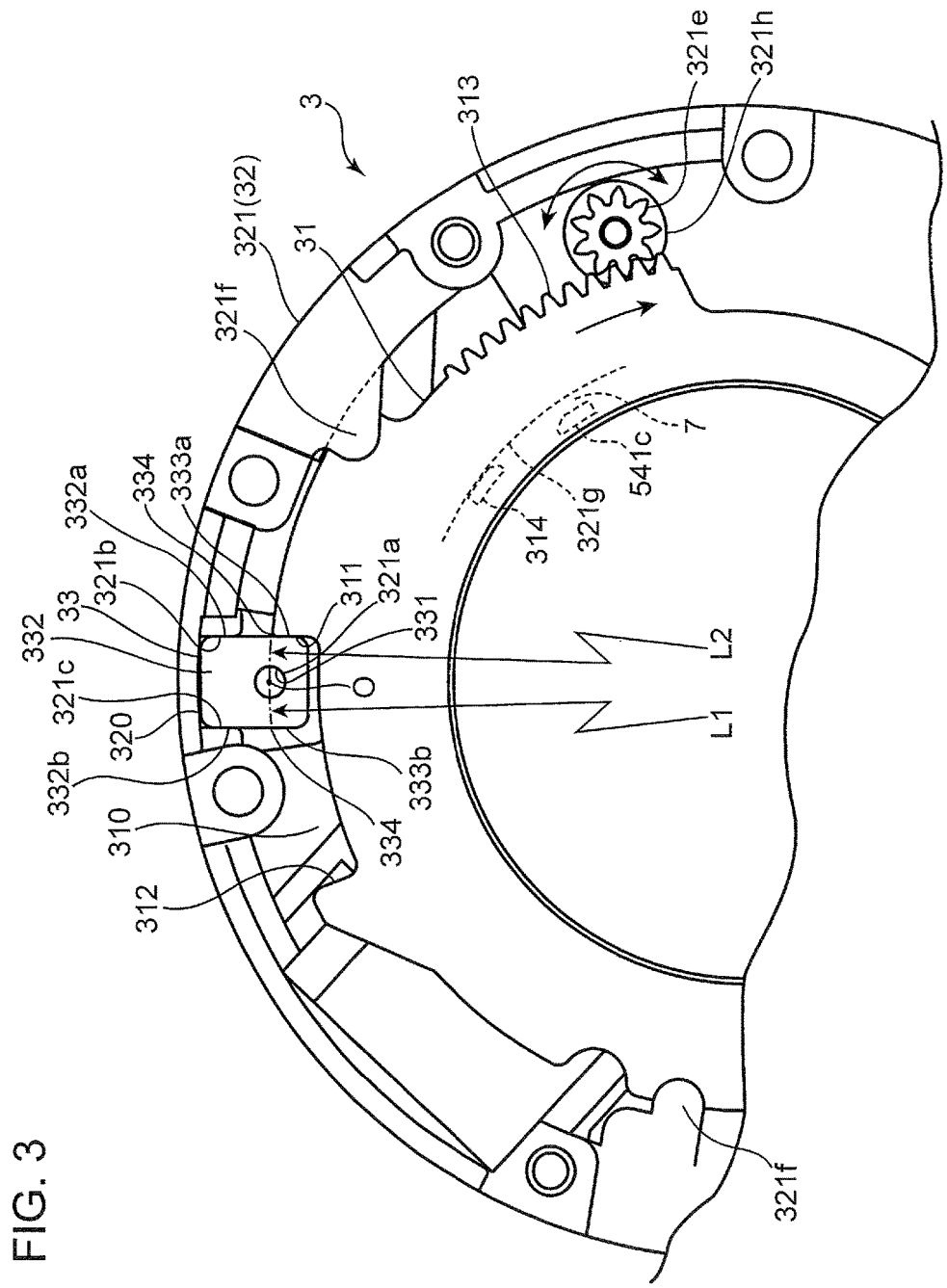
FIG. 3 is a partial and enlarged front view showing a state where a rotating ring used in the rotation regulating device shown in FIG. 1 is rotated and contacted and stopped.
Figure 4:
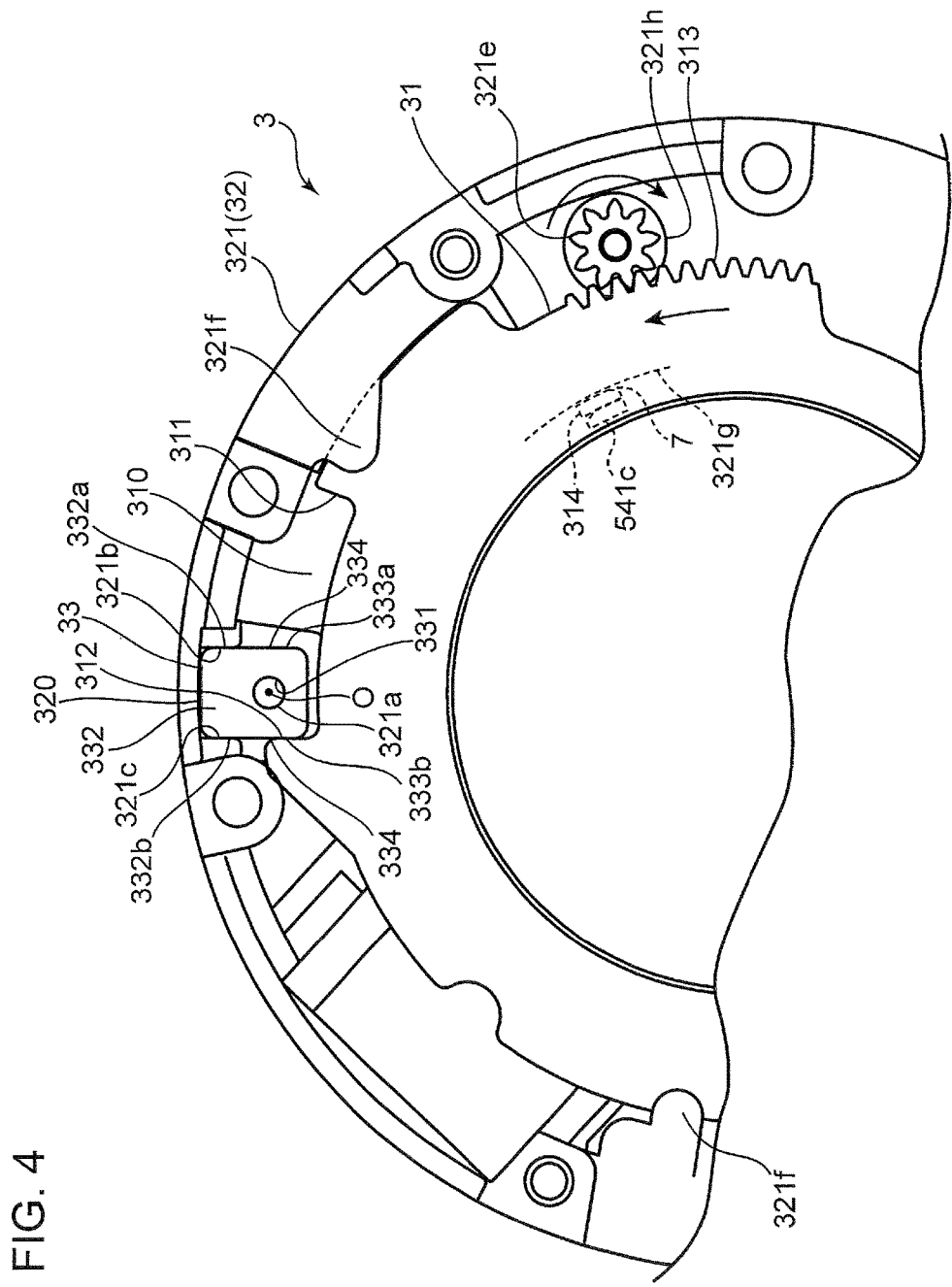
FIG. 4 is a partial and enlarged front view showing a state where the rotating ring is rotated in an opposite direction and contacted and stopped from the state shown in FIG. 3.

FIG. 1 is a sectional view of a lens barrel including a rotation regulating device in one or more embodiments. FIG. 2 is an exploded perspective view of a part of the rotation regulating device shown in FIG. 1. FIG. 3 is a partial and enlarged front view showing a state where a rotating ring used in the rotation regulating device shown in FIG. 1 is rotated and contacted and stopped. FIG. 4 is a partial and enlarged front view showing a state where the rotating ring is rotated in an opposite direction and contacted and stopped from the state shown in FIG. 3. Note that, in the following description, an X-direction shown is a direction toward an object side and a Y-direction shown is a direction toward an image side.

The lens barrel 1 according to one or more embodiments includes a barrel main body 2 and a rotation regulating device 3 as shown in FIG. 1. The barrel main body 2 includes a hollow cylindrical fixing cylinder 4 and lens groups 51 to 54.

The lens groups include a first lens group 51, a second lens group 52, a third lens group 53 and a fourth lens group 54 successively arranged from the object side toward the image side in one or more embodiments.

Each of the first and second lens groups 51, 53 includes one or more lenses. An effective diameter outside portion 511, 531 (see FIG. 1) in each of the first and third lens groups 51, 53 is fixedly held in the fixing cylinder 4.

The second lens group 52 includes one or more lenses. An effective diameter outside portion 521 of the second lens group 52 is held movably in an optical axis direction (X-Y direction, axial direction of the fixing cylinder 4) in the fixing cylinder 4.

The fourth lens group 54 constitutes a camera shake correction lens for correcting a camera shake and includes one or more lenses. An effective diameter outside portion 541 of the fourth lens group 54 is so held in the fixing cylinder 4 as to be able to switch between a fixed state and an unfixed state.

First and second coils (not shown) are attached to the effective diameter outside portion 541 of this fourth lens group 54. A radially inner side sandwiching portion 541c to be fixed to a holder 32 via an operating piece for fixing 314 of the rotating ring 31 to be described later is attached to the effective diameter outside portion 541 of the fourth lens group 54.

The rotation regulating device 3 includes the rotating ring 31, the holder 32 that rotatably holds the rotating ring 31, and a rotation regulator 33 for contacting and stopping the rotating ring 31 as shown in FIG. 2.

The rotating ring 31 is a member for switching the fourth lens group 54 between the fixed state to the holder 32 and the unfixed state in one or more embodiments. This rotating ring 31 has a substantially circular ring shape and includes a first contacted/stopped portion 311 and a second contacted/stopped portion 312, which are arranged at a distance from each other in a circumferential direction and to be contacted and stopped by the rotation regulator 33, on the outer periphery.

The first and second contacted/stopped portions 311, 312 constitute a recess 310 formed by recessing a part of the outer periphery of the rotating ring 31 having a predetermined length radially inwardly into a substantially U shape. Out of two inner surfaces of the recess 310 facing in the circumferential direction, the one on a clockwise side of FIGS. 2 and 3 serves as the first contacted/stopped portion 311 and the one on a counterclockwise side of FIGS. 2 and 3 serves as the second contacted/stopped portion 312.

The rotating ring 31 includes a gear 313 on a circumferential side of the first contacted/stopped portion 311 on the outer periphery. The rotating ring 31 includes the operating piece for fixing 314 on an image-side surface facing the holder 32. The operating piece for fixing 314 projects toward the holder 32 on the image side from an image-side surface of the rotating ring 31.

As shown in FIGS. 1 and 2, the holder 32 includes a first holder 321 that rotatably holds the rotating ring 31 on an object-side surface facing the rotating ring 31 and a second holder 322 arranged on a side opposite to the first holder 321 across the effective diameter outside portion 541 of the fourth lens group 54.

The first holder 321 includes a plurality of (three in one or more embodiments) holding pieces 321f rotatably holding the rotating ring 31, one holding shaft 321a holding the rotation regulator 33 and rotation stoppers 321b, 321c that stop the rotation regulator 33 held on the holding shaft 321a to prevent the rotation regulator 33 from rotating about the holding shaft 321a.

The holding shaft 321a is a solid cylindrical member and projects toward the rotating ring 31 from one surface of the first holder 321 in one or more embodiments. Note that this holding shaft 321a may be formed of a body separate from the first holder 321 or may be integrally formed in molding the first holder 321.

The rotation stopper includes two first and second rotation stoppers 321b, 321c arranged at a distance from each other in the circumferential direction of the rotating ring 31 to form a rotation regulator receiver 320 (receiver 320) therebetween.

The first holder 321 includes a drive gear 321e meshed with the gear 313 of the rotating ring 31 on a side circumferentially spaced apart from the holding shaft 321a. This drive gear 321e is mounted on a shaft of a drive motor 321h held on an image-side surface of the first holder 321 and rotates toward one side with the rotation of the drive motor 321h toward the one side and rotates toward the other side with the rotation of the drive motor 321h toward the other side.

The first holder 321 includes a hole 321i for light transmission in a central part and a radially outer side sandwiching portion 321g on the inner periphery of the hole 321i. This radially outer side sandwiching portion 321g is formed at such a position as to have a larger diameter than the radially inner side sandwiching portion 541c.

The thus configured first holder 321 holds the rotating ring 31 by the holding pieces 321f and is fixedly held in the fixing cylinder 4 in that state. With the rotation of the drive gear 321e toward one side, the rotating ring 31 rotates toward the other side opposite to the drive gear 321e. With the rotation of the drive gear 321e toward the other side, the rotating ring 31 rotates toward the one side.

As shown in FIG. 1, the second holder 322 includes a hole for light transmission in a central part. The second holder 322 includes a first magnet (not shown) arranged at a position facing the first coil attached to the fourth lens group 54 on the object-side surface facing the effective diameter outside portion 541 of the fourth lens group 54 and a second magnet (not shown) arranged at a position facing the second coil.

The thus configured second holder 322 is arranged at an image side of the first holder 321 and fixedly held in the fixing cylinder 4.

In this state, the effective diameter outside portion 541 of the fourth lens group 54 is arranged movably in a radial direction of the fixing cylinder 4 perpendicular to the optical axis direction by being pressed against a bearing (not shown) provided on the second holder 322 by a biasing member (not shown) between the first and second holders 321, 322. A clearance 7 is formed in the radial direction between the radially outer side sandwiching portion 321g of the first holder 321 and the radially inner side sandwiching portion 541c of the fourth lens group 54 (see FIG. 3).

Next, the rotation regulator 33 is described. The rotation regulator 33 is formed of an elastic body made of synthetic rubber, urethane foam or the like. As shown in FIG. 3, the rotation regulator 33 according to one or more embodiments has a substantially rectangular parallelepiped-shape having a predetermined thickness and includes a shaft fitting hole 331 into which the holding shaft 321a of the first holder 321 is to be fitted. This shaft fitting hole 331 may be formed to have a circular cross-sectional shape. Note that the shaft fitting hole 331 may be formed to have a polygonal cross-sectional shape such as a hexagonal cross-sectional shape or an octagonal cross-sectional shape.

The rotation regulator 33 includes a fitter 332 to be fitted into the rotation regulator receiver 320 of the first holder 321 on one longitudinal side and contact stoppers 333a, 333b for contacting and stopping the rotating ring 31 on the other longitudinal side.

The fitter 332 includes a first point of contact 332a that contacts with the first rotation stopper 321b of the first holder 321 on one widthwise end surface of the rotation regulator 33 and a second point of contact 332b configured to come into contact with the second rotation stopper 321c of the first holder 321 on the other widthwise end surface of the rotation regulator 33.

The contact stopper is composed of the first contact stopper 333a formed on the one widthwise end surface of the rotation regulator 33 for contacting and stopping the first contacted/stopped portion 311 of the rotating ring 31 and the second contact stopper 333b formed on the other widthwise end surface of the rotation regulator 33 for contacting and stopping the second contacted/stopped portion 312 of the rotating ring 31. By respectively forming the first contact stopper 333a on the one widthwise end surface of the rotation regulator 33 along the circumferential direction of the rotating ring 31 and the second contact stopper 333b on the other end surface, the rotation regulator can be easily formed.

In the thus configured rotation regulator 33, the fitter 332 on the one longitudinal side is located radially outwardly of the rotating ring 31 (first holder 321), the contact stoppers 333a, 333b on the other longitudinal side are located radially inwardly of the rotating ring 31 (first holder 321) and the holding shaft 321a is fitted into the shaft fitting hole 331 with the contact stoppers 333a, 333b arranged in the recess 310 of the rotating ring 31. In this way, the rotation regulator 33 is held on the first holder 321.

In this held state, the fitter 332 of the rotation regulator 33 is fitted into the rotation regulator receiver 320 of the first holder 321, a first point of contact 332a and a first rotation stopper 321b of the first holder 321 are in contact and a second point of contact 332b and a second rotation stopper 321c of the first holder 321 are in contact. Thus, the rotation regulator 33 is stopped to prevent the rotation regulator 33 from rotating about the holding shaft 321a.

In this state, a width direction of the rotation regulator 33 extends along the circumferential direction of the rotating ring 31 (first holder 321), the first contact stopper 333a and the first contacted/stopped portion 311 of the rotating ring 31 are facing each other in the circumferential direction and the second contact stopper 333b and the second contacted/stopped portion 312 of the rotating ring 31 are facing each other in the circumferential direction.

In this state, the position of an axial center O of the holding shaft 321a in the radial direction of the rotating ring 31 is arranged at the same position as or inwardly of an outermost side portion 334 located on an outermost side in the radial direction of the rotating ring 31 on each of the first and second contact stoppers 333a, 333b of the rotation regulator 33.

In one or more embodiments, a distance L1 from a center of the rotating ring 31 to the axial center O of the holding shaft 321a and a distance L2 from the center of the rotating ring 31 to the outermost side portion 334 are substantially equal and the axial center O of the holding shaft 321a and the outermost side portion 334 are formed substantially at the same position in the radial direction of the rotating ring 31.

Next, the operation of the lens barrel 1 of one or more embodiments is described. When the drive gear 321e rotates in a counterclockwise direction of FIG. 3 and the rotating ring 31 rotates clockwise (toward the other side) by starting the drive motor 321h from the state of FIG. 3 where the first contacted/stopped portion 311 of the rotating ring 31 is contacted and stopped by a first contact stopper 333a, the second contacted/stopped portion 312 of the rotating ring 31 is contacted and stopped by a second contact stopper 333b as shown in FIG. 4.

At that time, the rotation regulator 33 receives a moment from the second contacted/stopped portion 312 and that moment becomes larger toward a radially outer side and is maximized at the outermost side portion 334 located at the outermost side on the second contact stopper 333b. In one or more embodiments, the holding shaft 321a is so arranged that the position of the axial center O in the radial direction of the rotating ring 31 is substantially at the same position as the outermost side portion 334 of the second contact stopper 333b (i.e. the position of the axial center O and the position of the outermost side portion 334 are arranged on a concentric circle), the moment applied to the second contact stopper 333b of the rotation regulator 33 from the second contacted/stopped portion 312 of the rotating ring 31 can be received by the holding shaft 321a and the moment about the holding shaft 321a applied to the rotation regulator 33 can be suppressed to be small. Therefore, a possibility of the deformation and breakage of the rotation regulator 33 formed of the elastic body is reduced.

In rotating the rotating ring 31, the operating piece for fixing 314 of the rotating ring 31 is fitted into the clearance 7 between the radially outer side sandwiching portion 321g of the first holder 321 and the radially inner side sandwiching portion 541c of the fourth lens group 54 and the first holder 321 and the fourth lens group 54 are fixed as shown in FIG. 4, whereby the fourth lens group 54 is set in the fixed state.

On the other hand, when the drive gear 321e rotates in a clockwise direction of FIG. 4 and the rotating ring 31 rotates counterclockwise (toward the one side) from this state shown in FIG. 4, the first contacted/stopped portion 311 of the rotating ring 31 is contacted and stopped by the first contact stopper 333a as shown in FIG. 3.

Also in this case, the position of the axial center O of the holding shaft 321a in the radial direction of the rotating ring 31 is arranged at the same position as the outermost side portion 334 of the first contact stopper 333a. Thus, a moment applied to the first contact stopper 333a of the rotation regulator 33 from the first contacted/stopped portion 311 of the rotating ring 31 can be received by the holding shaft 321a and the moment about the holding shaft 321a applied to the rotation regulator 33 can be suppressed to be small. Therefore, a possibility of the deformation and breakage of the rotation regulator 33 formed of the elastic body is reduced.

In rotating the rotating ring 31, the operating piece for fixing 314 of the rotating ring 31 comes out of the clearance 7 between the radially outer side sandwiching portion 321g of the first holder 321 and the radially inner side sandwiching portion 541c of the fourth lens group 54.

In this way, the first holder 321 and the fourth lens group 54 are unfixed and the fourth lens group 54 is set in the unfixed state. In this state, the fourth lens group 54 becomes movable in the radial direction of the fixing cylinder 4 perpendicular to the optical axis direction.

A camera shake correction is performed by moving the fourth lens group 54 in the radial direction of the fixing cylinder 4. For example, the fourth lens group 54 moves toward one radial side of the fixing cylinder 4 if a current flows in the first coil and the fourth lens group 54 moves toward the other radial side of the fixing cylinder 4 if a current flows in the second coil, whereby the camera shake correction is performed.

Note that although the rotation regulating device 3 is used in the lens barrel 1 in one or more embodiments, there is no limitation to the use in the lens barrel 1 and the rotation regulator 3 can be used in various other devices other than the lens barrel 1 and the use thereof can be appropriately changed.

This specification discloses various aspects of technology as described above. Out of those, main technologies are summarized below.

A rotation regulating device according to one or more embodiments of the present invention includes a rotating ring, a holder that rotatably holds the rotating ring, a rotation regulator that regulates a rotation of the rotating ring by contacting and stopping the rotating ring, and a receiver that receives a part of the rotation regulator. The rotation regulator is held on the holder and is formed of an elastic body. The holder includes one holding shaft that holds the rotation regulator and a rotation stopper that stops the rotation regulator to prevent the rotation regulator from rotating about the holding shaft. The rotation stopper includes a first rotation stopper and a second rotation stopper arranged at a distance from each other in a circumferential direction of the rotating ring to form the receiver therebetween. The rotation regulator includes a fitter that is received by the receiver and has a predetermined width in the circumferential direction, a first point of contact that is formed on one widthwise end surface of the fitter and contacts with the first rotation stopper and a second point of contact that is formed on the other widthwise end surface of the fitter and contacts with the second rotation stopper.

Since the rotation regulator is held on the one holding shaft formed on the holder and the rotation regulator held on the holding shaft is stopped to prevent the rotation regulator from rotating about the holding shaft by the rotation stopper in such a rotation regulating device, the holding shaft is easily formed at a predetermined position and a displacement of the rotation regulator relative to the holder is reduced. In addition, in the above rotation regulating device, a length of rotation regulator formed of the elastic body in the circumferential direction of the rotating ring can be shortened, the dimensional accuracy of the rotation regulator can be improved, the rotation regulator can be arranged in a narrow space and the entire rotation regulating device can be miniaturized.

Since the above rotation regulating device includes the first point of contact on the one widthwise end surface of the rotation regulator and the second point of contact on the other widthwise end surface along the circumferential direction of the rotating ring, a moment about the holding shaft applied to the rotation regulator can be received by the rotation regulator over the entire width, a possibility of the deformation of the rotation regulator can be reduced and the moment about the holding shaft applied to the rotation regulator can be reliably received.

In another mode, in the above rotation regulating device, the holding shaft is so arranged that the position of an axial center thereof in a radial direction of the rotating ring is at the same position as or inwardly of an outermost side portion located on an outermost side in the radial direction of the rotating ring on each of first and second contact stoppers of the rotation regulator held on the holding shaft.

In such a rotation regulating device, a moment about the holding shaft applied to the rotation regulator can be suppressed to be small when the rotating ring is contacted and stopped by the first and second contact stoppers of the rotation regulator and the rotating ring can be reliably contacted and stopped.

More specifically, when the first and second contact stoppers of the rotation regulator respectively contact and stop a first contacted/stopped portion and a second contacted/stopped portion of the rotating ring, a moment is applied to the rotation regulator from the first or second contacted/stopped portion. That moment becomes larger toward a radially outer side of the first or second contacted/stopped portion and is maximized at the outermost side portion located at the outermost side. Since the position of the axial center of the holding shaft in the radial direction of the rotating ring is arranged at the same position as or inwardly of the outermost side portions of the first and second contact stoppers of the rotation regulator held on the holding shaft in the above configuration, the holding shaft can receive the moment applied to the rotation regulator from the first or second contacted/stopped portion of the rotating ring and the moment about the holding shaft applied to the rotation regulator from the first or second contacted/stopped portion can be suppressed to be small.

In another mode, a lens barrel includes any one of the above rotation regulating devices.

In such a lens barrel, since the rotation regulator is held on the one holding shaft formed on the holder and the rotation regulator held on the holding shaft is stopped not to rotate about the holding shaft by the rotation stopper, the holding shaft is easily formed at a predetermined position and a displacement of the rotation regulator relative to the holder is reduced. In addition, in the above lens barrel, a length of the rotation regulator formed of the elastic body in the circumferential direction of the rotating ring can be shortened, the dimensional accuracy of the rotation regulator can be improved, the rotation regulator can be arranged in a narrow space and the entire lens barrel can be miniaturized. In the above lens barrel, a moment about the holding shaft applied to the rotation regulator can be received by the rotation regulator over the entire width, a possibility of the deformation of the rotation regulator can be reduced and the moment about the holding shaft applied to the rotation regulator can be reliably received.

This application is based on Japanese Patent Application No. 2014-255120 filed on Dec. 17, 2014, the contents of which are hereby incorporated by reference.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. A rotation regulating device, comprising:
   a rotating ring;
   a holder that rotatably holds the rotating ring;
   a rotation regulator that regulates a rotation of the rotating ring by contacting and stopping the rotating ring, the rotation regulator being held on the holder and being formed of an elastic body; and
   a receiver that receives a part of the rotation regulator;
   wherein the holder comprises:
      a holding shaft that holds the rotation regulator; and
      a rotation stopper that stops the rotation regulator to prevent the rotation regulator from rotating about the holding shaft,
   the rotation stopper comprises:
      a first rotation stopper; and
      a second rotation stopper, the first and second rotation stoppers being arranged at a distance from each other in a circumferential direction of the rotating ring to form the receiver between the first and second rotation stoppers, and
   the rotation regulator comprises:

a fitter that is the part of the rotation regulator received by the receiver and has a predetermined width in the circumferential direction;

a first point of contact that is formed on one widthwise end surface of the fitter and contacts with the first rotation stopper; and a second point of contact that is formed on the other widthwise end surface of the fitter and contacts with the second rotation stopper.

2. A rotation regulating device according to claim 1, wherein the holding shaft comprises an axial center, and the axial center is located, in a radial direction of the rotating ring, at the same position as or inwardly of an outermost side portion located on an outermost side in the radial direction of the rotating ring on each of first and second contact stoppers of the rotation regulator held on the holding shaft.

3. A lens barrel, comprising a rotation regulating device according to claim 1.

* * * * *